United States Patent
Drevon et al.

(10) Patent No.: US 10,999,816 B2
(45) Date of Patent: May 4, 2021

(54) PAGING OPTIMIZATION IN A MOBILE NETWORK

(71) Applicant: Alcatel Lucent, Boulogne-Billancourt (FR)

(72) Inventors: Nicolas Drevon, Nozay (FR); Alistair Urie, Nozay (FR); Laurent Thiebaut, Nozay (FR); Philippe Godin, Nozay (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/542,964

(22) PCT Filed: Jan. 13, 2016

(86) PCT No.: PCT/EP2016/050560
§ 371 (c)(1),
(2) Date: Jul. 12, 2017

(87) PCT Pub. No.: WO2016/113302
PCT Pub. Date: Jul. 21, 2016

(65) Prior Publication Data
US 2018/0270787 A1    Sep. 20, 2018

(30) Foreign Application Priority Data
Jan. 14, 2015 (EP) .................... 15305027

(51) Int. Cl.
*H04W 68/02* (2009.01)
*H04W 36/16* (2009.01)
(Continued)

(52) U.S. Cl.
CPC ....... *H04W 68/02* (2013.01); *H04W 36/0061* (2013.01); *H04W 36/16* (2013.01);
(Continued)

(58) Field of Classification Search
CPC ............. H04W 36/0061; H04W 36/16; H04W 36/385; H04W 68/02
See application file for complete search history.

(56) References Cited

U.S. PATENT DOCUMENTS

2010/0220680 A1* 9/2010 Ramankutty ......... H04W 68/08
370/329
2011/0136517 A1 6/2011 Seppalainen et al.
(Continued)

FOREIGN PATENT DOCUMENTS

EP    2254378 A1    11/2010
KR    2011-0002835 A    1/2011
(Continued)

OTHER PUBLICATIONS

Vodafone, "Page Loading Reduction", S2-144273, SA WG2 Meeting 106, Nov. 17, 2014, San Francisco, pp. 1-3.
(Continued)

*Primary Examiner* — Jamal Javaid
*Assistant Examiner* — Ryan C Kavleski
(74) *Attorney, Agent, or Firm* — Harness, Dickey & Pierce, P.L.C.

(57) ABSTRACT

In an embodiment, a Radio Access Network RAN entity, referred to as serving RAN entity, and controlling one or more cells, is configured to:
send to a Core Network CN entity, referred to as serving CN entity, a list of recommended cells for paging of a User Equipment UE in idle mode.

24 Claims, 3 Drawing Sheets

Figure 1:
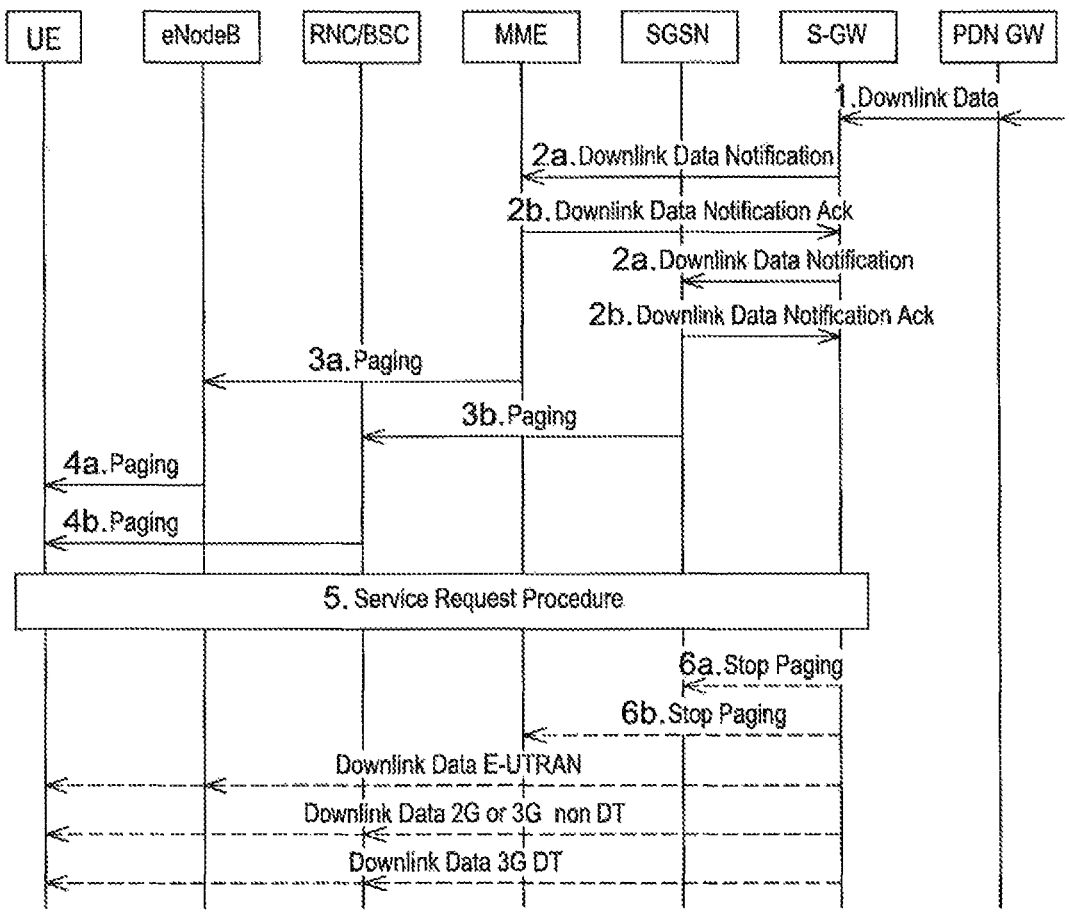

(51) Int. Cl.
*H04W 68/04* (2009.01)
*H04W 76/30* (2018.01)
*H04W 36/00* (2009.01)
*H04W 36/38* (2009.01)
*H04W 92/10* (2009.01)

(52) U.S. Cl.
CPC ......... *H04W 36/385* (2013.01); *H04W 68/04* (2013.01); *H04W 76/30* (2018.02); *H04W 92/10* (2013.01)

(56) References Cited

U.S. PATENT DOCUMENTS

| | | | | |
|---|---|---|---|---|
| 2012/0115515 A1* | 5/2012 | Lopez | ................... | H04W 68/04 455/458 |
| 2013/0023301 A1* | 1/2013 | Wang | ................... | H04W 92/20 455/525 |
| 2014/0044051 A1* | 2/2014 | Kamalaraj | ............ | H04W 8/065 370/328 |
| 2014/0155109 A1 | 6/2014 | Vaidya et al. | | |
| 2014/0179357 A1 | 6/2014 | Salvador et al. | | |
| 2014/0198767 A1 | 7/2014 | Heo et al. | | |
| 2015/0215894 A1* | 7/2015 | Hayashi | ................ | H04W 68/02 455/458 |
| 2015/0282118 A1* | 10/2015 | Vaidya | ................... | H04W 8/06 455/458 |
| 2016/0249402 A1* | 8/2016 | Zhang | ................... | H04W 68/08 |

FOREIGN PATENT DOCUMENTS

| | | |
|---|---|---|
| WO | WO-2014/048478 A1 | 4/2014 |
| WO | WO-2014/168859 A2 | 10/2014 |

OTHER PUBLICATIONS

International Search Report PCT/ISA/210 for International Application No. PCT/EP2016/050560 dated Feb. 18, 2016.
Written Opinion of the International Searching Authority PCT/ISA/237 for International Application No. PCT/EP2016/050560 dated Feb. 18, 2016.
Korean Office Action dated Jul. 29, 2019 in Korean Application No. 10-2017-7022739, with an English translation.
Office Action for corresponding Japanese Application No. 2017-537234 dated Jun. 18, 2019, with an English language translation.
Korean Office Action dated Oct. 22, 2019 in Korean Application No. 10-2017-7022739, with an English translation.
Japanese Office Action dated May 26, 2020, issued in corresponding Japanese Patent Application No. 2017-537234.
Japanese Office Action dated Dec. 15, 2020 issued in coresponding Japanese Appln. No. 2017-537234.
Korean Office Action dated Jan. 8, 2021 issued in corresponding Korean Appln. No. 10-2017-7022739.
European Office Action dated Jan. 29, 2021 issued in corresponding European Appln. No. 15305027.3.
Chinese Office Action dated Mar. 2, 2021 issued in corresponding Chinese Appln. No. 201680015191.6.
Huawei. "Handover target selection for Category 0 UEs." 3GPP TSG RAN WG3#85, R3-141632, Dresden, Germany, Aug. 18-22, 2014.

* cited by examiner

PAGING OPTIMIZATION IN A MOBILE NETWORK

CROSS-REFERENCE TO RELATED APPLICATIONS

This application is a national phase under 35 U.S.C. § 371 of PCT International Application No. PCT/EP2016/050560 which has an International filing date of Jan. 13, 2016, which claims priority to European Application No. 15305027.3, filed Jan. 14, 2015, the entire contents of each of which are hereby incorporated by reference.

The present invention generally relates to mobile communication networks and systems.

Descriptions of mobile networks and systems can be found in the literature, such as in particular in Technical Specifications published by standardization bodies such as for example 3GPP ($3^{rd}$ Generation Partnership Project).

In a mobile system, a mobile terminal also called User Equipment UE, has access to a mobile network providing mobile communication services. A mobile network generally comprises a Core Network (CN) accessed via a Radio Access Network (RAN).

An example of 3GPP mobile system is EPS (Evolved Packet System), specified in particular in 3GPP TS 23.401. An EPS network comprises a Core Network called EPC (Evolved Packet Core) that can be accessed by a Radio Access Network (RAN) such as E-UTRAN or UTRAN/GERAN. EPC entities include Mobility Management Entity (MME) for E-UTRAN access to EPC, or Serving GPRS Support Node (SGSN) for UTRAN/GERAN access to EPC). E-UTRAN entities include eNodeB (eNB). Each RAN entity controls one or more cells.

In such systems, a registered UE may be in connected mode (if the UE is known by the RAN), or in idle mode (if the UE is not known by the RAN). In connected mode the UE location is known to the accuracy of a cell in the RAN, whereas in idle mode the UE location is only known to the accuracy of a geographical area in the CN (such as a list of Tracking Areas (TA) for E-UTRAN access to EPC).

When a downlink packet is received for an UE in idle mode, a procedure such as, for EPS, a network triggered service request procedure (recalled in FIG. 1 taken from 3GPP TS 23.401) is performed, including a paging procedure. For E-UTRAN access to EPC for example, the paging procedure includes sending Paging messages by the MME serving the UE, on S1AP interface, to eNBs belonging to the TAs in which the UE is registered, and paging the UE by the eNBs on the radio interface, in cells belonging to TAs in which the UE is registered. In the same way, for UTRAN/GERAN access to EPC, the paging procedure includes sending Paging messages by the SGSN serving the UE, to RNCs/BSCs belonging to the Routing Area RA in which the UE is registered, and paging the UE by the RNCs/BSCs in cells belonging to the RA in which the UE is registered.

As recognized by the inventors and as will be described with more detail later, there is a need for optimization of such paging mechanism, in particular to reduce paging load on radio interface and/or on CN entities such as MMEs/SGSNs, in particular for Machine Type Communications (MTC), and/or for low-mobility or stationary UEs, and/or for UEs with restricted radio capabilities and/or for RAN entities such as eNBs with a large number of cells, and/or for CN entities such as MMEs/SGSNs controlling a large number of cells. More generally, there is a need to improve performances of such systems.

Embodiments of the present invention in particular address such needs. Embodiments of the present invention are not limited to E-UTRAN access to EPC, and may also apply to UTRAN/GERAN access to EPC in EPS, or to systems other than EPS, such as for example UMTS or GPRS.

These and other objects are achieved, in one aspect, by a Radio Access Network RAN entity, referred to as serving RAN entity, and controlling one or more cells, configured to:
  send to a Core Network CN entity, referred to as serving CN entity, a list of recommended cells for paging of a User Equipment UE in idle mode.

These and other objects are achieved, in another aspect, by a Radio Access Network RAN entity, such as eNodeB eNB or Radio Network Controller RNC or Base Station Controller BSC, referred to as source RAN entity at inter RAN entity handover of a User Equipment UE from said source RAN entity to a RAN entity such as eNB or RNC or BSC, referred to as target RAN entity, said source RAN entity configured to:
  send towards said target RAN entity, such as in a Handover Request message over X2 interface or Iur interface or in a container transparent to CN entities over S1, S10, Iu, S3 or Gn interfaces, a list of cells the UE has been connected to, and of neighbour cells neighbouring said cells.

These and other objects are achieved, in another aspect, by a Core Network CN entity, referred to as serving CN entity, configured to:
  receive from a Radio Access Network RAN entity, referred to as serving RAN entity, and controlling one or more cells, a list of recommended cells for paging of a User Equipment UE in idle mode.

These and other objects are achieved, in other aspects, by method(s) comprising one or more step(s) performed by such entity(ies).

Figure 2:
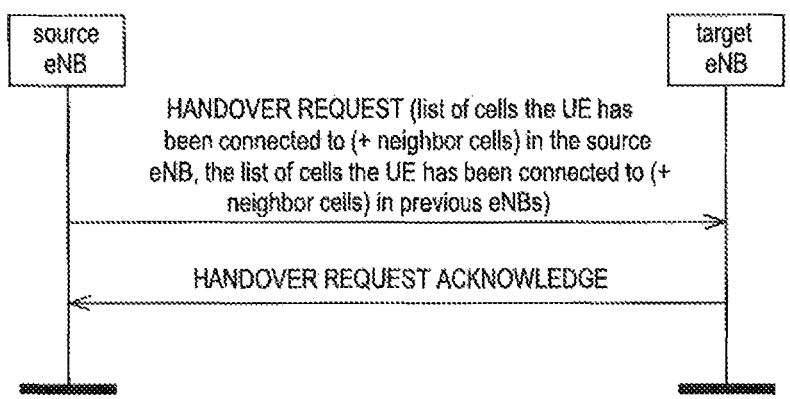
Figure 3:
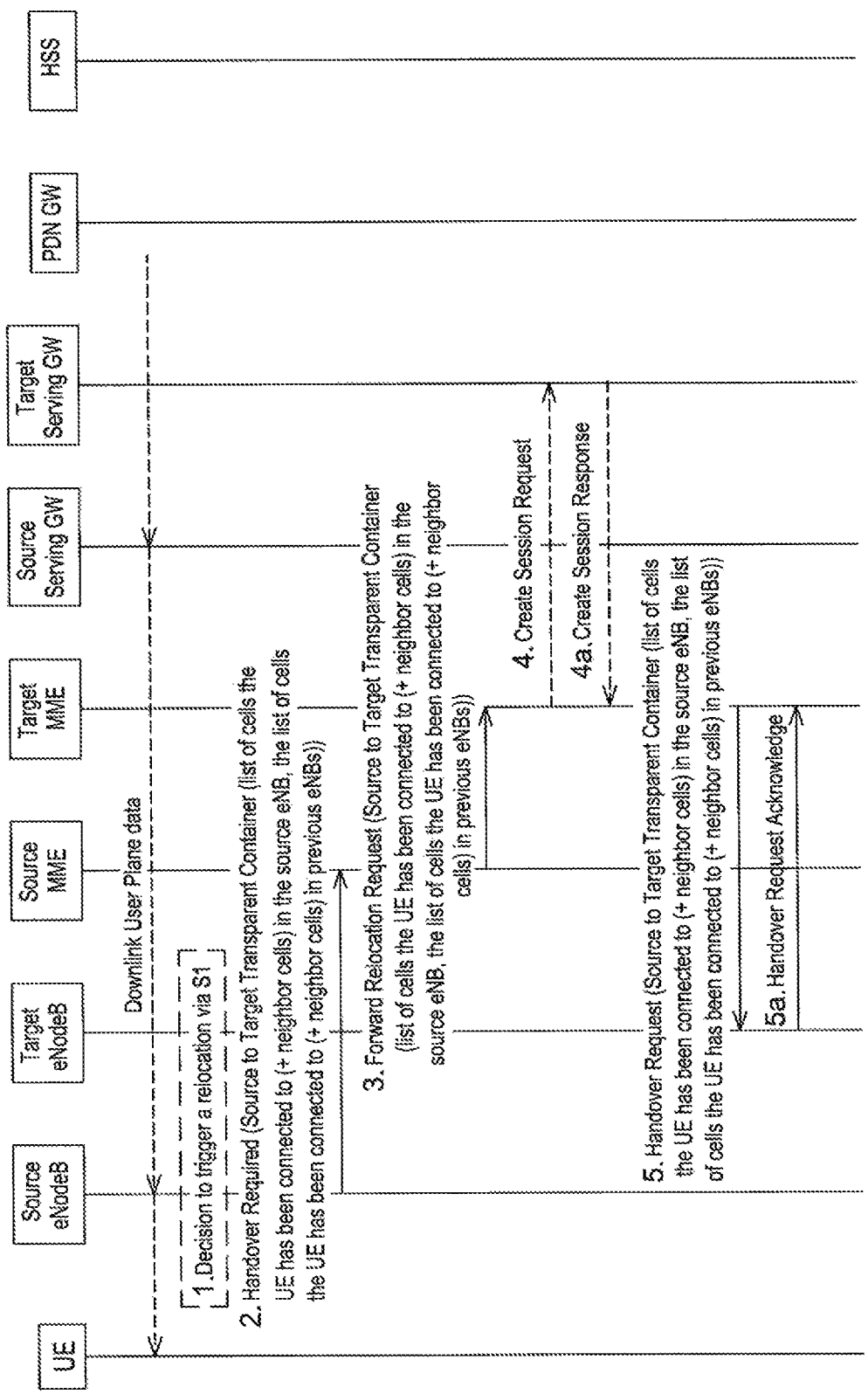
Figure 4:
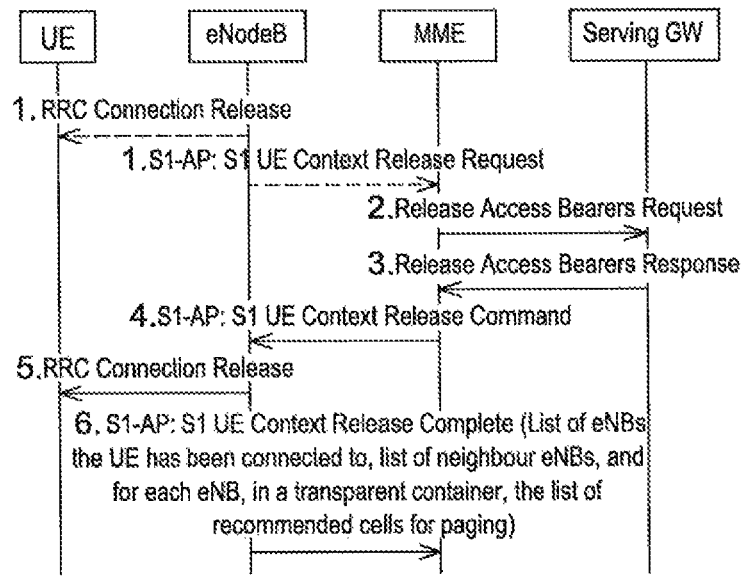
Figure 5:
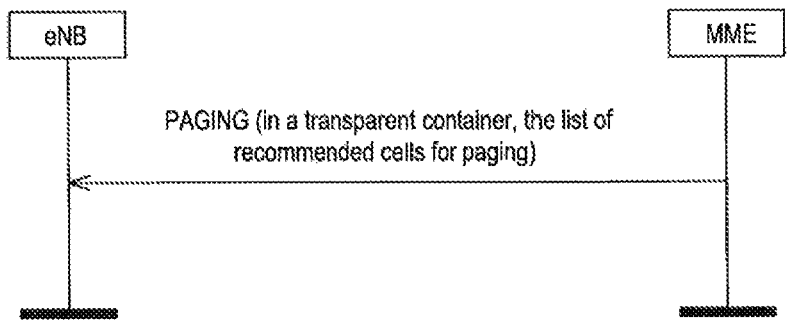
Figure 6:
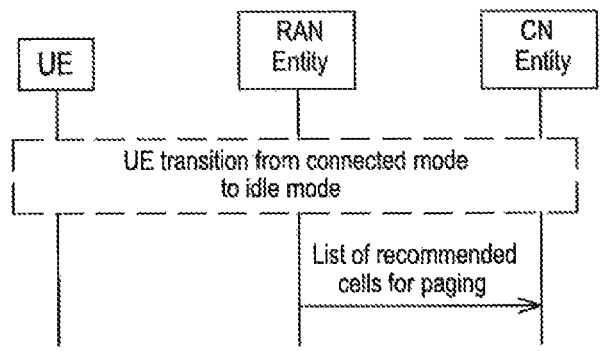

Some embodiments of apparatus and/or methods in accordance with embodiments of the present invention are now described, by way of example only, and with reference to the accompanying drawings, in which:

FIG. 1 is intended to recall paging performed for example during a network triggered service request procedure in EPS according to current state of the art, FIG. 2 is intended to illustrate a first example of signaling flow according to embodiments of the invention, FIG. 3 is intended to illustrate a second example of signaling flow according to embodiments of the invention, FIG. 4 is intended to illustrate a third example of signaling flow according to embodiments of the invention, FIG. 5 is intended to illustrate a fourth example of signaling flow according to embodiments of the invention, FIG. 6 is intended to illustrate a fifth example of signaling flow according to embodiments of the invention.

Following description of embodiments of the invention will be made by way of example for E-UTRAN access to EPC. However, as indicated above, embodiments of the invention are not limited to such example.

Examples of paging load issues will first be described, by way of example for E-UTRAN access to EPC.

A paging strategy may be implemented at MME side. Paging strategy at MME side includes paging the UE in one or more steps e.g. in the last seen eNB in the first place, then in all eNBs of the TAs list the UE is registered in. The MME can also know the last eNBs a UE has been connected to for a certain time and can page it in those eNBs. Paging strategies also include some optimizations specified in TS 23.401 clause 5.3.4.3. But paging mechanisms specified in 3GPP are not fully optimized: e.g. with the dramatic increase of Machine Type Communications (MTC) terminals the paging load on both radio interface and MME might become a problem.

An example of radio interface load issue is when the MME sends a Paging message to an eNB for a UE in idle mode, the eNB does not have a context for that UE and hence does not know the UE radio capabilities yet. The eNB therefore pages the UE over all the cells of that eNB even if the UE does not support the cell frequency band.

Another example of radio interface load issue is that the MME does not see whether the UE moves between cells within an eNB and thus is not able to detect UE mobility pattern (e.g. no mobility because the UE is stationary, small mobility between a few cells or large scale mobility). So in case of an eNB with a large number of cells, when the MME requests to page the UE, the eNB currently pages in all its cells even if the UE is stationary.

An example of MME load issue is for sending paging messages to large number of eNBs, especially for low-mobility or stationary devices or smart phones that rarely move: the MME can store in the UE context the last eNB or a list of eNBs where the UE has been seen by the MME during some configured time, but this list does not comprise the very neighbor cells of those eNBs (that might be served by a different eNB). A problem is that, when the MME has paged the UE via the eNB(s) that previously served the UE when it was last connected and if the UE has not responded, the MME has to page in the whole list of TAs the UE is registered in. In other words, the MME does not know the close neighborhood of the eNBs the UE used to be served by the last time it was in connected state. The list of neighbor cells of an eNB, when associated with a given UE context, should only contain cells that are compatible with capabilities of that UE (e.g. with regards to radio frequency band).

Additionally, for radio interface issue, a recent set of CRs has been agreed for low complexity UEs at 3GPP (S2-143796, R2-143977, R2-143978 and R3-141890) that consists in the serving eNB sending a UE CAPABILITY INDICATION message with a new UE Radio Capability for Paging information element, that is stored by the MME in the UE context, and then appended to next Paging messages to the eNBs: it allows the eNBs receiving the Paging messages to optimize the radio interface as they could for example page a low complexity UE with a specific transmission power (since such low complexity/low cost UEs are not planned with a very sensitive receiver). But this is limited to category 0 (low complexity) UEs.

Another solution that was disclosed in S2-144273 includes the sending of the supported frequency bands from the serving eNB to the MME in a transparent container that the MME stores and then appends to next Paging messages to the eNBs. This solution avoids paging the UE in cells that use a frequency band not supported by the UE.

Similar paging load issues could arise e.g. for UTRAN or GERAN access to Evolved Packet Core EPC or to GPRS Packet Core.

There is a need for optimization of paging mechanisms, in particular to reduce paging load, more generally to improve performances of such systems.

Various aspects and/or embodiments of the invention addressing such needs will now be described, first, by way of example for E-UTRAN access to EPC.

Embodiments of the invention introduce paging optimizations solving radio signaling and/or core network load issues related to paging under one or more, and preferably all, of following conditions:

the MME shall keep the control of the overall paging strategy i.e. the MME should be able to decide whether to page the UE in one or several steps depending on existing knowledge such as the subscription profile, the service for which the UE is paged, etc.;

both Core Network awareness of cells i.e. which cell is controlled by which RAN entity and Core Network unawareness of cells should be supported: the MME is currently unaware of cells and only knows the eNB level; but another type of Core Network Serving Node may know the cell level (for example a 2G-SGSN knows the cell the UE/MS is camping on when the UE/MS is in READY state "In READY state, the SGSN MM context corresponds to the STANDBY MM context extended by location information for the subscriber on the cell level");

the chance to reach the UE in the first place should be enhanced, while minimizing the number of cells the UE is paged;

paging the UE under cells for which the UE has no capability to camp on (e.g. not supported frequency band) should be avoided.

Embodiments of the invention introduce the idea of paging assistance from the radio access network, which may include at least one of: assisting the MME in determining relevant eNBs that the MME should send paging messages to, assisting the MME in providing to a relevant eNB a list of relevant cells in which the eNB should page the UE.

Embodiments of the invention take advantage of the fact that, in existing specifications, the serving eNB can know the UE radio capabilities when the UE is in connected mode.

Embodiments of the invention take advantage of the fact that the serving eNB can know the list of cells the UE has been connected to within the serving eNB, as well as their neighbor cells (compatible with the UE radio capabilities) of the cells the UE has been connected to.

Embodiments of the invention take advantage of the fact that, when the UE is in connected mode, the serving eNB can collect the list of cells the UE has been connected to in previous eNBs, e.g. at inter-eNB handovers via S1 or X2 interfaces, the target eNB can receive such list from the source eNB. This may rely on the exchange of "UE History Information" IE (Information Element) at inter-eNB handover over X2 or S1 interface. This IE is defined in particular in 3GPP TS 36.423 or 3GPP TS 36.413, as containing information about cells that a UE has been served by in active and/or idle state prior to the target cell. However, in existing specifications, this IE is used by the target eNB for future handover preparation.

One aspect of the invention, in an embodiment, is that the source eNB can provide to the target eNB the neighbor cells (compatible with the UE radio capabilities) of the cells the UE has been connected to.

Another aspect of the invention, in an embodiment, is that the serving eNB can build a list of "recommended eNBs for paging" that is based on the list of eNBs the UE has been connected to, and optionally on eNBs that serve the neighbor cells (compatible with the UE radio capabilities) of the cells that the UE has been connected to. The information has to come from an ENB, as the MME can know the list of eNBs the UE has been connected to, but does not know and should not have to know the real eNB neighborhood.

Another aspect of the invention, in an embodiment, is that the serving eNB can build, for each eNB in the list of "recommended eNBs for paging", a "recommended list of cells for paging", based on the information provided by the source eNB at inter-eNB handovers (i.e. the list of cells the UE has been connected to in the order of connection of the UE, with, for each cell, the duration of the time the UE stayed in the cell, and the list of its neighbors compatible with the UE radio capabilities).

Another aspect of the invention, in an embodiment, is that, advantageously at S1 Release procedure, the eNB can provide the MME with the list of "recommended eNBs for paging" and, for each eNB, a "recommended list of cells for paging". The MME does not need to know the list of cells, but needs to know the list of eNBs to send paging messages to (for future UE paging). The "recommended list of cells for paging" controlled by a given eNB can be carried in a container that is transparent to the MME, which is in line with the principle of MME being independent of cells.

In existing specifications, the serving eNB can send a container "UE radio capabilities for paging IE" sent to the MME in the message UE Capability Info Indication to the MME, stored by the MME but transparent, and sent in the message Paging by the MME to the eNB. This IE has been introduced in the CR 1255 to TS 36.413 (R3-141890) and CR 1579 to TS 36.331 (R2-143977) for conveying an indication on whether the UE is a "low complexity UE" (category 0). This IE can be extended to convey other UE radio capabilities (in LTE but also in UTRAN) such as the supported frequency bands or combinations of frequency bands, the supported mode(s) (FDD/TDD), etc.). The presence of the extended "UE radio capabilities for paging IE" in the Paging messages to the eNBs, allows the receiving eNBs to avoid paging in cells that the UE cannot support. This mechanism saves radio signaling. Another aspect of the invention is that the transparent container or part of the transparent container common to any eNB, stored by the MME, and sent in Paging message to any eNB may be a Paging Information Data Block, which contains information useful for eNB paging strategy that is understood only by eNBs.

Another aspect of the invention, in an embodiment, is that the MME can use the above information to send paging messages in a first step to the "list of recommended eNBs for paging" advantageously together with the "list of recommended cells" for each eNB or alternatively with the "UE radio capabilities for paging IE", then in a second step to all the eNBs that are involved in the "list of TAs" the UE is registered to advantageously together with the "UE radio capabilities for paging IE".

In some embodiments, one or more of following aspects may be provided:
  in order to minimize the cells through which the UE will be paged in the first place while maximizing the paging success a list of cells towards which the UE should be paged (referred to as list of "recommended cells for paging") should be provided by the serving eNB to the MME at S1 Release.
  In order to minimize the area i.e. the number of cells through which the UE will be paged in the first place while maximizing the paging success the list of "recommended cells for paging" should be built by the serving eNB from the cells the UE has been connected to and from their neighbours.
  In order to allow the serving eNB to build the list of recommended cells for paging, it is proposed to enhance the UE History Information with the addition of the list of neighbour cells to cells the UE has been connected to.
  The MME may store the list of recommended cells with a timestamp in order to assess whether the list of recommended cells for paging is still relevant or not when paging the UE later on.
  The list of recommended cells for paging sent by the serving eNB to the MME is organized as a list of eNBs to be paged, each one with a list of recommended cells for paging in a transparent container.

Aspects and/or embodiments of the invention described above for E-UTRAN with Enhanced Packet Core can be extended to UTRAN and GERAN, with GPRS core or Enhanced Packet Core, where RNS (Radio Network Subsystem) and BSS (Base Station Subsystem) acts as eNB, and where SGSN acts as MME. The inter-eNB handover can be extended to inter-RNC or inter-BSC handovers and to inter-RAT handovers.

A list of recommended cells for paging not organized by RAN entities should be used instead of the above-described list of "recommended eNBs for paging and, for each eNB in this list, a recommended list of cells for paging", for the case of GERAN interfacing an MSC or for any case where the CN entity can derive, from such list of recommended cells for paging not organized by RAN entities, a list of corresponding RAN entities (such as BSCs for GERAN) to send Paging messages to. Actually in the BSS Management Application Part (BSSMAP) defined in 3GPP 48.008, the MSC can send to the BSS a "PAGING" message (defined in § 3.2.1.19) where the MSC can provide in its paging request a Cell Identifier List (defined in § 3.2.2.27). In an embodiment of this invention, in a CLEAR COMPLETE message sent to the MSC, the last BSS serving the UE (and releasing the A interface connection for this UE), can add a list of recommended cells for paging Some embodiments are illustrated in FIGS. 2 to 5, by way of example for E-UTRAN access to EPC.

FIG. 2 illustrates X2-based handover signaling as specified in 3GPP TS 36.423, augmented with embodiments of the invention: The list of cells the UE has been visiting (and optionally a limited number (e.g. 3) of neighbor cells optionally compatible with the UE radio capabilities) in the source eNB, the list of cells the UE has been visiting (and optionally a limited number (e.g. 3) of neighbor cells optionally compatible with the UE radio capabilities) in previous eNBs, is added to the Handover Request message over X2 interface. This can be extended to Iur interface between two RNCs (for the UTRAN case). This information exchanged between RAN nodes is ordered (per the sequence of cells the UE has been visiting) and associated with information on the duration of stay of the UE in the cells in order to be able to assess at paging time whether a cell information is still relevant. Furthermore a cell put in the list as a "neighbor cell" should be associated with a cell the UE has been visiting, in order to help determining when this neighbor cell information is no more relevant.
  FIG. 3 illustrates S1-based handover signaling as specified in 3GPP TS 23.401, augmented with embodiments of the invention: The list of cells the UE has been visiting (and optionally a limited number (e.g. 3) of neighbor cells optionally compatible with the UE radio capabilities) in the source eNB, the list of cells the UE has been visiting (and optionally a limited number (e.g. 3) of neighbor cells optionally compatible with the UE radio capabilities) in previous eNBs, is added to the Source to Target Transparent Container carried over the Handover Required and Handover Request messages over S1 interface, and over the Forward Relocation Request message over S10 interface. This information exchanged between RAN nodes is ordered (per the sequence of cells the UE has been visiting) and associated with information on the duration of stay of the UE in the cells in order to be able to assess at paging time whether a cell information is still relevant. Furthermore a cell put in the list as a "neighbor cell" should be associated with a cell the UE has been visiting, in order to help determining when this neighbor cell information is no more relevant.

This can be extended respectively to Iu interface between a RNC and a SGSN (Relocation Required/Request), and to S3 and Gn interfaces between two SGSNs or between a MME and a SGSN (for the UTRAN case).

FIG. 4 illustrates S1 Release signaling as specified in 3GPP TS 23.401, augmented with embodiments of the invention: The "list of recommended cells for paging", organized as a list of recommended eNBs and for each eNB, in a container transparent for the Core Network, the "list of recommended cells for paging", is added to the S1 UE Context Release Complete. The "list of recommended cells for paging" may be based on the cells the UE has been connected to (and/or has been visiting) in the serving eNB as well as in previous eNBs, and the list of their neighbors compatible with the UE radio capabilities. The "list of recommended cells for paging", may be put in a transparent container that is understood only by eNBs. The transparent container or part of the transparent container common to any eNB and send in Paging message to any eNB may be a Paging Information Data Block, that is also understood only by eNBs. This can be extended to Iu Release Complete between a RNC and a SGSN (for the UTRAN case).

As an implementation choice, the serving Node (MME/SGSN) could store a timestamp when it has received the list of recommended cells for paging, in order to assess whether this information is still relevant or not when later on paging the UE.

As an implementation choice, the eNB that sends the list of recommended cells for paging should ensure that this list has a limited size (e.g. a total of 16 cells or 32 cells) to avoid sending obsolete information or to avoid pushing the MME towards actually paging in more cells than it would have done when it would have chosen to page in the last TA where the UE was camping.

FIG. 5 illustrates S1 Paging related signaling as specified in 3GPP TS 36.413, augmented with embodiments of the invention: When the MME needs to page the UE, it may:

send the S1AP Paging message towards the eNBs of the list of recommended eNBs provided by the E-UTRAN and, for a given eNB, it appends the list of recommended cells for paging that was provided by the E-UTRAN, or selects the eNBs towards which to send the S1AP Paging message, and for each eNB, append the transparent container common to any eNB that may include Paging Information Data Block that was provided by the E-UTRAN and stored by the MME.

When considering the information received from the Serving Node (MME) in a (S1) Paging request, the RAN Node (ENB) has to keep only the cells belonging to the Tracking Area Identities (also) put in the Paging message. This is to take into account that the ENB that has built the list of recommended cells for paging was not aware of the list of Tracking Area Identities on which the UE is registered.

FIG. 6 illustrates sending a list of recommended cells for paging of a User Equipment UE in idle mode, by a serving RAN entity, to a serving CN entity, e.g. upon transition of the UE from idle mode to connected mode. In this embodiment, this "list of recommended cells for paging" is not organized in RAN entities. This embodiment can be used, for example for the case of GERAN access by a MSC, or for any case where cells are known by the Core Network, which can derive corresponding RAN entities to send Paging messages to.

In one aspect, there is provided a Radio Access Network RAN entity, referred to as serving RAN entity.

Various embodiments are provided, which may be taken alone or in combination, according to various combinations, including (though not limited to) following embodiments.

In an embodiment, said RAN entity is configured to:
send to a Core Network CN entity, referred to as serving CN entity, a list of recommended cells for paging of a User Equipment UE in idle mode.

In an embodiment, said RAN entity, such as eNodeB eNB or Radio Network Controller RNC, is configured to:
send to said CN entity, such as Mobility Management Entity MME or Serving GPRS Support Node SGSN, a list of recommended cells for paging of said UE organised as a list of recommended RAN entities to send Paging messages to, and for each RAN entity a list of recommended cells for paging of said UE.

In an embodiment, said RAN entity is configured to:
send to said CN entity UE Radio Paging Capabilities, in a container transparent to said CN entity.

In an embodiment, said RAN entity is configured to:
send to said CN entity a list of recommended cells for paging of said UE, for each RAN entity of said list of recommended RAN entities, in a container transparent to said CN entity.

In an embodiment, said RAN entity is configured to:
build said list of recommended cells, based on a list of cells the UE has been connected to in connected mode.

In an embodiment, said RAN entity is configured to:
build said list of recommended cells, based on a list of cells the UE has been connected to in connected mode, and of neighbour cells neighbouring said cells.

In an embodiment, said RAN entity is configured to:
build said list of recommended cells, based on a list of cells the UE has been connected to in connected mode, and of neighbour cells neighbouring said cells and compatible with radio capabilities of said UE.

In an embodiment, said RAN entity is configured to:
build said list of recommended cells, based on a list of cells the UE has been connected to in connected mode, and of neighbour cells neighbouring said cells and compatible with radio capabilities of said UE associating each neighbouring cell with a cell the UE has been connected to in connected mode.

In an embodiment, said RAN entity is configured to:
collect a list of cells the UE has been connected to in connected mode.

In an embodiment, said RAN entity is configured to:
collect a list of cells the UE has been connected to in connected mode, and of neighbour cells neighbouring said cells.

In an embodiment, said RAN entity is configured to:
collect a list of cells the UE has been connected to in connected mode, and of neighbour cells neighbouring said cells compatible with UE Radio Capabilities.

In an embodiment, said RAN entity is configured to:
collect, at inter RAN entity handover, a list of cells the UE has been connected to in connected mode in previously serving RAN entities.

In an embodiment, said RAN entity is configured to:
collect, at inter RAN entity handover, a list of cells the UE has been connected to in connected mode in previously serving RAN entities, and of neighbour cells neighbouring said cells.

In an embodiment, said RAN entity is configured to:
collect, at inter RAN entity handover, a list of cells the UE has been connected to in connected mode in previously serving RAN entities, and of neighbour cells neighbouring said cells compatible with UE Radio Capabilities.

In an embodiment, said RAN entity is configured to:
send said list of recommended cells to said CN entity at transition of said UE from connected mode to idle mode.

In an embodiment, said RAN entity is configured to:
send said list of recommended RAN entities, and for each recommended RAN entity a list of recommended cells for paging of said UE, to said CN entity at transition of said UE from connected mode to idle mode, such as during S1 Release procedure or during Iu Release procedure.

In another aspect, there is provided a Radio Access Network RAN entity, such as eNodeB eNB, or Radio Network Controller RNC, or Base Station Controller BSC, referred to as a source RAN entity at inter RAN entity handover of a User Equipment UE from said source RAN entity to a RAN entity such as eNB or RNC or BSC referred to as target RAN entity.

Various embodiments are provided, which may be taken alone or in combination, according to various combinations, including (though not limited to) following embodiments.

In an embodiment, said RAN entity is configured to:
send towards said target RAN entity, such as in a Handover Request message over X2 interface or Iur interface or in a container transparent to CN entities over S1, S10, Iu, S3 or Gn interfaces, a list of cells the UE has been connected to, and of neighbour cells neighbouring said cells.

In an embodiment, said RAN entity is configured to:
send towards said target RAN entity a list of cells the UE has been connected to in said source RAN entity and of neighbour cells neighbouring said cells, and a list of cells the UE has been connected to in previous RAN entities and of neighbour cells neighbouring said cells.

In another aspect, there is provided a Core Network entity, referred to as serving CN entity.

Various embodiments are provided, which may be taken alone or in combination, according to various combinations, including (though not limited to) following embodiments.

In an embodiment, said CN entity is configured to:
receive from a Radio Access Network RAN entity, referred to as serving RAN entity, a list of recommended cells for paging of a User Equipment UE in idle mode.

In an embodiment, said CN entity, such as Mobility Management Entity MME or Serving GPRS Support Node SGSN, is configured to:
receive a list of recommended cells for paging of said UE organised as a list of recommended RAN entities to send Paging messages to, and for each recommended RAN entity a list of recommended cells for paging of said UE, from a RAN entity such as eNode B eNB or Radio Network Controller RNC.

In an embodiment, said CN entity is configured to:
receive said list of recommended cells for paging of said UE, at transition of said UE from connected mode to idle mode,
derive a list of RAN entities to send Paging messages to.

In an embodiment, said CN entity is configured to:
receive said list of recommended RAN entities, and for each recommended RAN entity a list of recommended cells for paging of said UE, at transition of said UE from connected mode to idle mode, such as during S1 Release procedure or during Iu Release procedure.

In an embodiment, said CN entity is configured to:
set a timestamp when it receives said list of recommended RAN entities, store it with said list and use it to assess whether said list is still relevant or not when later it pages the UE.

In an embodiment, said CN entity is configured to:
set a timestamp when it receive said list of recommended cells, store it with said list and use it to assess whether said list is still relevant or not when later it pages the UE.

In an embodiment, said CN entity is configured to:
send Paging messages towards RAN entities of said list of RAN entities,
append to a Paging message sent to a RAN entity, a list of recommended cells for paging by said RAN entity.

In an embodiment, said CN entity is configured to:
send Paging messages towards RAN entities of said list of RAN entities,
append to a Paging message sent to a RAN entity, information related to UE radio capabilities for paging.

In an embodiment, said CN entity is configured to:
send Paging messages towards RAN entities of said list of RAN entities in a first step,
if no response to said paging is received from the UE in said first step, send Paging messages to all RAN entities of a geographical area in which the UE is registered.

Other aspects relate to related method(s) comprising one or more step(s) performed by such entity(ies).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising: at least one computer configured to cause the apparatus at least to,
provide functions of a radio access network entity serving a user equipment,
send to a core network entity serving said user equipment a list of recommended cells for paging of said user equipment, organised as a list of recommended radio access network entities to send paging messages to, and for a radio access network entity of said list of recommended radio access network entities, a list of recommended cells for paging of said user equipment by said radio access network entity of said list of recommended radio access network entities.

2. The apparatus according to claim 1, wherein the computer is further configured to cause the apparatus at least to:
send to said core network entity user equipment radio paging capabilities, in a container transparent to said core network entity.

3. The apparatus according to claim 1, wherein the computer is further configured to cause the apparatus at least to:
send said list of recommended cells for paging of said user equipment, for at least one radio access network entity of said list of recommended radio access network entities, in a container transparent to said core network entity.

4. The apparatus according to claim 1, wherein the computer is further configured to cause the apparatus at least to:
build said list of recommended cells, based on a list of cells the user equipment has been connected to in connected mode.

5. The apparatus according to claim 1, wherein the computer is further configured to cause the apparatus at least to:
build said list of recommended cells, based on a list of cells the user equipment has been connected to in connected mode, and of neighbour cells neighbouring said cells.

6. The apparatus according to claim 1, wherein the computer is further configured to cause the apparatus at least to:
build said list of recommended cells, based on a list of cells the user equipment has been connected to in connected mode, and of neighbour cells neighbouring said cells and compatible with radio capabilities of said user equipment.

7. The apparatus according to claim 1, wherein the computer is further configured to cause the apparatus at least to:
build said list of recommended cells, based on a list of cells the user equipment has been connected to in connected mode, and of neighbour cells neighbouring said cells and compatible with radio capabilities of said user equipment associating each neighbouring cell with a cell the user equipment has been connected to in connected mode.

8. The apparatus according to claim 1, wherein the computer is further configured to cause the apparatus at least to:
collect a list of cells the user equipment has been connected to in connected mode.

9. The apparatus according to claim 1, wherein the computer is further configured to cause the apparatus at least to:
collect a list of cells the user equipment has been connected to in connected mode, and of neighbour cells neighbouring said cells.

10. The apparatus according to claim 1, wherein the computer is further configured to cause the apparatus at least to:
collect a list of cells the user equipment has been connected to in connected mode, and of neighbour cells neighbouring said cells compatible with user equipment radio capabilities.

11. The apparatus according to claim 1, wherein the computer is further configured to cause the apparatus at least to:
collect, at inter radio access network entity handover, a list of cells the user equipment has been connected to in connected mode in previously serving radio access network entities.

12. The apparatus according to claim 1, wherein the computer is further configured to cause the apparatus at least to:
collect, at inter radio access network entity handover, a list of cells the user equipment has been connected to in connected mode in previously serving radio access network entities, and of neighbour cells neighbouring said cells.

13. The apparatus according to claim 1, wherein the computer is further configured to cause the apparatus at least to:
collect, at inter radio access network entity handover, a list of cells the user equipment has been connected to in connected mode in previously serving radio access network entities, and of neighbour cells neighbouring said cells compatible with user equipment radio capabilities.

14. The apparatus according to claim 1, wherein the computer is further configured to cause the apparatus at least to:
send said list of recommended radio access network entities and said list of recommended cells to said core network entity at transition of said user equipment from connected mode to idle mode.

15. An apparatus comprising:
at least one computer configured to cause the apparatus at least to,
provide functions of a core network entity serving a user equipment, and
receive from a radio access network entity serving said user equipment a list of recommended cells for paging of said user equipment organized as a list of recommended radio access network entities to send paging messages to, and for a radio access network entity of said list of recommended radio access network entities, a list of recommended cells for paging of said user equipment by said radio access network entity of said list of recommended radio access network entities.

16. The apparatus according to claim 15, wherein the computer is further configured to cause the apparatus at least to:
receive said list of recommended cells for paging of said user equipment, at transition of said user equipment from connected mode to idle mode; and
derive a list of radio access network entities to send paging messages to.

17. The apparatus according to claim 15, wherein the computer is further configured to cause the apparatus at least to:
receive said list of recommended radio access network entities and said list of recommended cells for paging of said user equipment at transition of said user equipment from connected mode to idle mode.

18. The apparatus according to claim 15, wherein the computer is further configured to cause the apparatus at least to:
set a timestamp when the apparatus receives said list of recommended radio access network entities, store the timestamp with said list of recommended radio access network entities, and use the timestamp to assess whether said list of recommended radio access network entities is still relevant or not when later the apparatus pages the user equipment.

19. The apparatus according to claim 15, wherein the computer is further configured to cause the apparatus at least to:
set a timestamp when the apparatus receives said list of recommended cells, store the timestamp with said list of recommended cells and use the timestamp to assess whether said list of recommended cells is still relevant or not when later the apparatus pages the user equipment.

20. The apparatus according to claim 15, wherein the computer is further configured to cause the apparatus at least to:
send paging messages towards radio access network entities of said list of radio access network entities; and
append to a paging message sent to one of the radio access network entities, a list of recommended cells for paging by said radio access network entity.

21. The apparatus according to claim 15, wherein the computer is further configured to cause the apparatus at least to:
send paging messages towards radio access network entities of said list of radio access network entities; and
append to a paging message sent to one of the radio access network entities, information related to user equipment radio capabilities for paging.

22. The apparatus according to claim 15, wherein the computer is further configured to cause the apparatus at least to:
send paging messages towards radio access network entities of said list of radio access network entities; and
send paging messages to all radio access network entities of a geographical area in which the user equipment is registered, if no response to said paging message is received from the user equipment.

23. A method for paging optimization in a mobile network, comprising:
sending to a core network entity from a radio access network entity serving a user equipment a list of recommended cells for paging of said user equipment, organised as a list of recommended radio access network entities to send paging messages to, and for a radio access network entity of said list of recommended radio access network entities, a list of recommended cells for paging of said user equipment by said radio access network entity of said list of recommended radio access network entities.

24. A method for paging optimization in a mobile network, comprising:
receiving at a core network entity from a radio access network entity serving a user equipment a list of recommended cells for paging of said user equipment, organised as a list of recommended radio access network entities to send paging messages to, and for a radio access network entity of said list of recommended radio access network entities, a list of recommended cells for paging of said user equipment by said radio access network entity.

* * * * *